United States Patent [19]

Kozawa et al.

[11] Patent Number: 4,469,453
[45] Date of Patent: Sep. 4, 1984

[54] ROTARY MULTI-MIRROR DRIVING MOTOR

[75] Inventors: Hiroomi Kozawa; Shinichi Nishino; Shigenobu Katagiri, all of Ibaraki, Japan

[73] Assignee: Hitachi Koki Company, Limited, Katsuta, Japan

[21] Appl. No.: 487,662

[22] Filed: Apr. 22, 1983

[30] Foreign Application Priority Data

Apr. 23, 1982 [JP] Japan ................................. 57-69166

[51] Int. Cl.³ ............................................. F16C 32/06
[52] U.S. Cl. ....................................... 384/117; 310/90
[58] Field of Search ................. 310/90; 384/117, 122, 384/306, 308, 309, 119

[56] References Cited

U.S. PATENT DOCUMENTS 2,873,152  2/1959  Thompson ........................... 384/309
3,985,405  10/1976  Okano et al. .......................... 384/117

FOREIGN PATENT DOCUMENTS 3015657  11/1980  Fed. Rep. of Germany ........ 310/90
148500   11/1978  Japan ................................... 384/309
56-6915   1/1981  Japan ................................... 384/309

Primary Examiner—J. D. Miller
Assistant Examiner—D. Rebsch
Attorney, Agent, or Firm—Sughrue, Mion, Zinn, Macpeak, and Seas

[57] ABSTRACT

A driving motor of the type employing pneumatic bearings is improved by reducing a weight moment of an upper pad by cutting away a portion thereof, to make the gaps of the bearing pads of the motor more nearly uniform.

5 Claims, 8 Drawing Figures

ROTARY MULTI-MIRROR DRIVING MOTOR

BACKGROUND OF THE INVENTION

This invention relates to an improved horizontal mirror motor for driving a rotary multi-mirror in an electrophotographic printer.

FIG. 1 is an explanatory diagram outlining the arrangement of an electrophotographic printer. A photosensitive drum 8 has characteristics such that has a high dielectric at dark regions, but its charges dissipate upon the reception of light. Thus, the drum 8 is similar to a photographic film. The surface of the drum 8 is exposed to the corona of a charger 7, and is then irradiated by a laser beam in correspondence to printing data. As a result, the charges at that part of the surface to which the laser beam has been applied dissipate, so that the latent image of the printing data is formed electrostatically.

The above-described process of applying the laser beam will now be described in more detail. The continuous laser beam from a laser oscillator 1 is divided into dots according to the printing data by a modulator 2, and is then applied through a rotary multi-mirror 3 and a reflecting mirror 6 to the surface of the photo-sensitive drum 8 in such a manner as to scan the latter, as a result of which the latent image of the printing data is formed thereon.

The latent image is developed with printing ink, or toner, by a developing unit 9. In succession, a transferring unit 11 applies a high voltage to the rear surface of a printing sheet conveyed by a traction drive 10, so that toner is transferred thereto. The toner is thermally fixed to the printing sheet 13 by a fixing unit (not shown). In the above-described electrophotographic printing method, characters and ruled lines on forms can be printed simultaneously, and therefore it is unnecessary to prepare many kinds of printed forms in advance, which contributes greatly to economical use of paper sheets.

However, the conventional printer of this type suffers from a problem that, as shown in the right hand portion of FIG. 2, a vertical ruled line of the form has a poor appearance, waving by about $\Delta x = 0.1$ to 0.2 mm. The reason for this is that the number of revolutions per minute of the mirror motor driving the rotary multi-mirror 3 changes slightly by 0.02 to 0.04%.

FIG. 3 is a diagram showing a process of forming a latent image, in which a laser beam 5 is scanned over a photo-sensitive drum 8 by a rotary multi-mirror 3. In this process, a beam detecting sensor 15 is employed for determining the start point of each scanning line. When the number of revolutions per minute of the mirror motor changes, the scanning distance LP which is scanned to print a desired ruled line is changed, as a result of which the vertical ruled line appears wavy.

FIG. 4 shows one example of a horizontal mirror motor. The motor employs dynamic pressure pneumatic bearings in order to reduce bearing torque as much as possible to decrease any variation in the number of revolutions per minute, and in order to eliminate troublesome replacement and maintenance of bearings.

As shown in FIG. 4, a rotary multi-mirror 3 is fixedly mounted on a mirror shaft 22. The mirror shaft 22 is supported in the radial direction by dynamic pressure pneumatic bearings each made up of three tilting pads 21 and in the thrust direction by repulsive magnets 25a and 25b. A rotor 23 and a stator 24 form the motor.

FIG. 5 is an enlarged view of the dynamic pressure type bearing section of FIG. 4. In FIG. 5, the pneumatic bearing of a pad 20c provides a floating force $F_1$ which corresponds to a moment $(WP \times l_{1W})$ provided by the weight (WP) of the pad 20c. $(F_1 \times l_{1F} = WP \times l_{1W})$.

The relation between the air gap g of the pneumatic bearing and the floating force F is as shown in FIG. 6. A considerably large floating force $F_1$ is provided by an air gap $g_1$ in FIG. 6, which gap is very small. When the air gap is eliminated by an external disturbance, the number of revolutions per minute is changed by the frictional resistance between the pad and the shaft.

SUMMARY OF THE INVENTION

Accordingly, an object of this invention is to reduce the variation in revolutions per minute of a mirror motor using dynamic pressure pneumatic bearings.

DETAILED DESCRIPTION OF THE PREFERRED EMBODIMENTS

Figure 1:
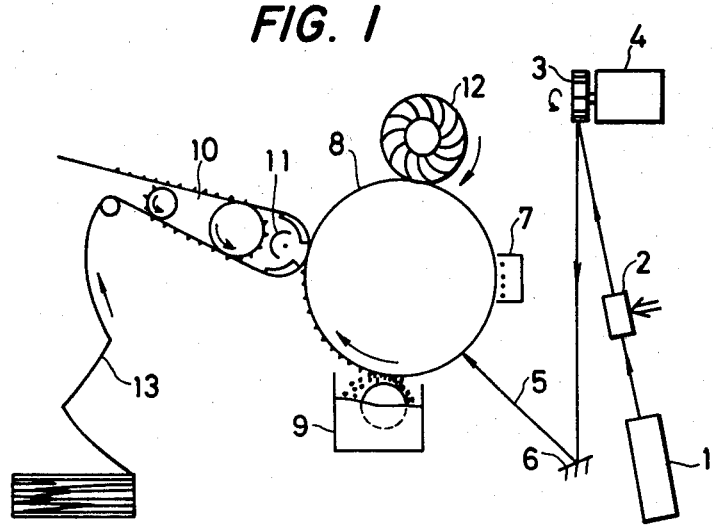
FIG. 1 is an explanatory diagram showing an electrophotographic printer.
Figure 2:
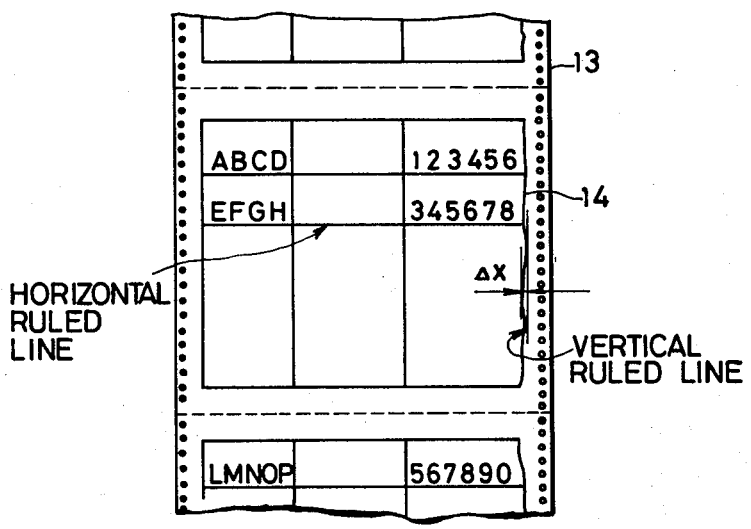
FIG. 2 is a plan view of a form printed by the printer of FIG. 1.
Figure 3:
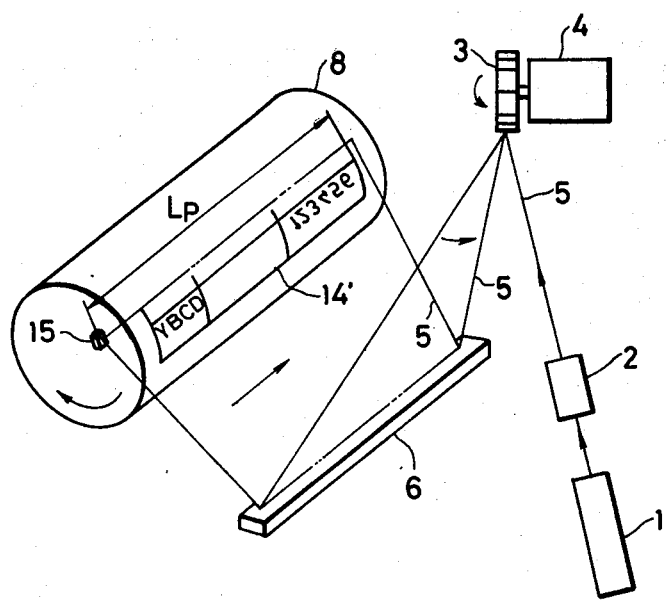
FIG. 3 is an explanatory diagram showing a laser beam scanning operation.
Figure 4:
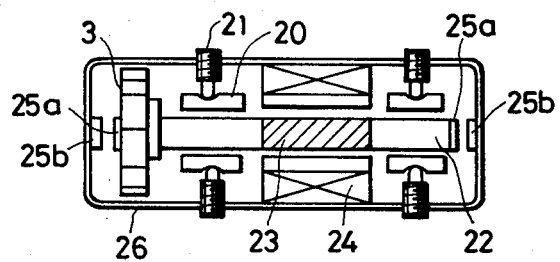
FIG. 4 is a longitudinal sectional view showing a horizontal mirror motor with dynamic pressure pneumatic bearings for driving a rotary multi-mirror.
Figure 5:
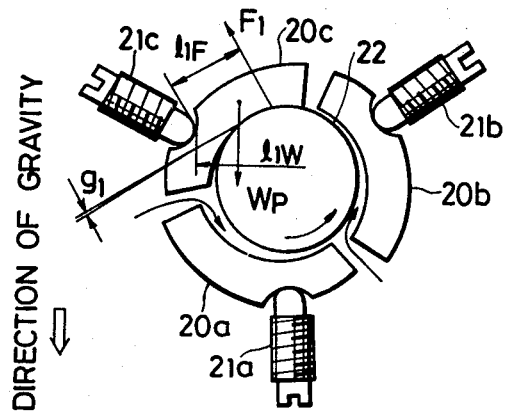
FIG. 5 is an explanatory diagram showing a conventional pneumatic bearing.
Figure 6:
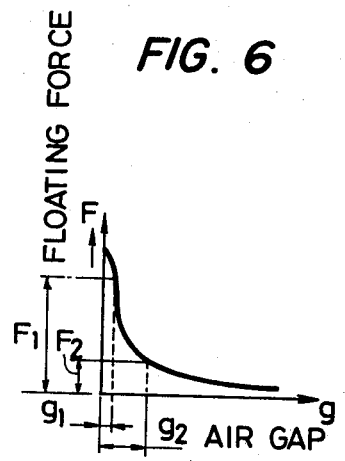
FIG. 6 is a graphical representation indicating air gap vs. floating force in a pneumatic bearing.
Figure 7:
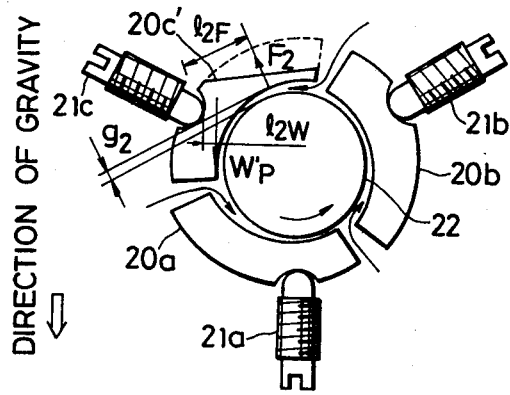
FIG. 7 is an explanatory diagram showing one example of a pneumatic bearing according to this invention.

One embodiment of the present invention is shown in FIG. 7. Heretofore, the three pneumatic bearing pads were exactly the same in configuration, so as to be common in utilization, and were arranged at angular intervals of 120°. In contrast, in FIG. 7, a portion of a pad 20c' which is located above a pivot 21c, is cut off to reduce the gravity moment. The relation between the weight Wp' of the pad 20c' and the average floating force $F_2$ of the pneumatic bearing is: $Wp' \times l_{2W} = F_2 \times l_{2F}$. As Wp' and $l_{2W}$ are decreased, $F_2$ is also decreased. Therefore, in FIG. 6, an air gap $g_2$ can be obtained for a floating force $F_2$.

Figure 8:
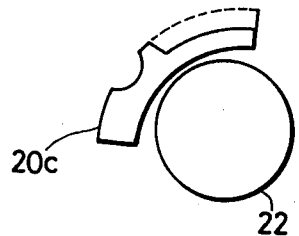
FIG. 8 is an explanatory diagram showing one modification of the pneumatic bearing according to the invention.

The pad 20c' is cut along a straight line as shown in FIG. 7; however, the invention is not limited thereto or thereby. That is, the pad may be cut as desired with the technical concept of the invention remaining effective. For instance, the pad may be cut as shown in FIG. 8. The weight of the pad may also be reduced by drilling or the like. Furthermore, since all that is required is to reduce the gravity moment about the pivot, a method may be employed in which the upper portion of the pad is modified in advance, or is formed of a different material.

As is apparent from the above description, according to the invention, the reduction in the pneumatic bearing floating gap due to the pad weight is eliminated. Therefore, the invention can provide a pneumatic bearing in which the three pads are uniform as regards the air gap, which contributes greatly to the elimination of variations in the number of revolutions per minute of the horizontal mirror motor.

What is claimed is:

1. A rotary driving motor, comprising:
   a rotary shaft (22);
   a rotor (23) mounted on said shaft;
   a stator (24) surrounding said rotor;
   dynamic pressure pneumatic bearing pad assemblies (20, 21) at both ends of said rotor, each assembly being formed by dividing a cylinder surrounding said shaft into several parts and providing a pad (20a, 20b, 20c) for each said part; and
   pivots (21a, 21b, 21c) supporting said pads; wherein a portion of an upper pad (21c) whose weight acts to depress said shaft is reduced in weight, to decrease a gravitational moment of said upper pad about it pivot due to said weight.

2. An apparatus as claimed in claim 1, wherein said rotary shaft comprises a mirror shaft for driving a rotary multi-mirror.

3. An apparatus as claimed in claim 1, wherein said rotary shaft is horizontally arranged within said motor.

4. An apparatus as claimed in claim 1, wherein said portion of said upper pad is reduced in weight by cutting away a portion thereof above the pivot for said pad.

5. An apparatus as claimed in claim 1, wherein said portion of said upper pad is reduced in weight by forming said portion of a lighter-weight material than the remainder of said pad.

* * * * *